Jan. 28, 1936.　　　　L. I. HULL　　　　2,029,170

PHOTOMETER

Filed Feb. 4, 1935　　　　2 Sheets-Sheet 1

INVENTOR
Lloyd Irving Hull

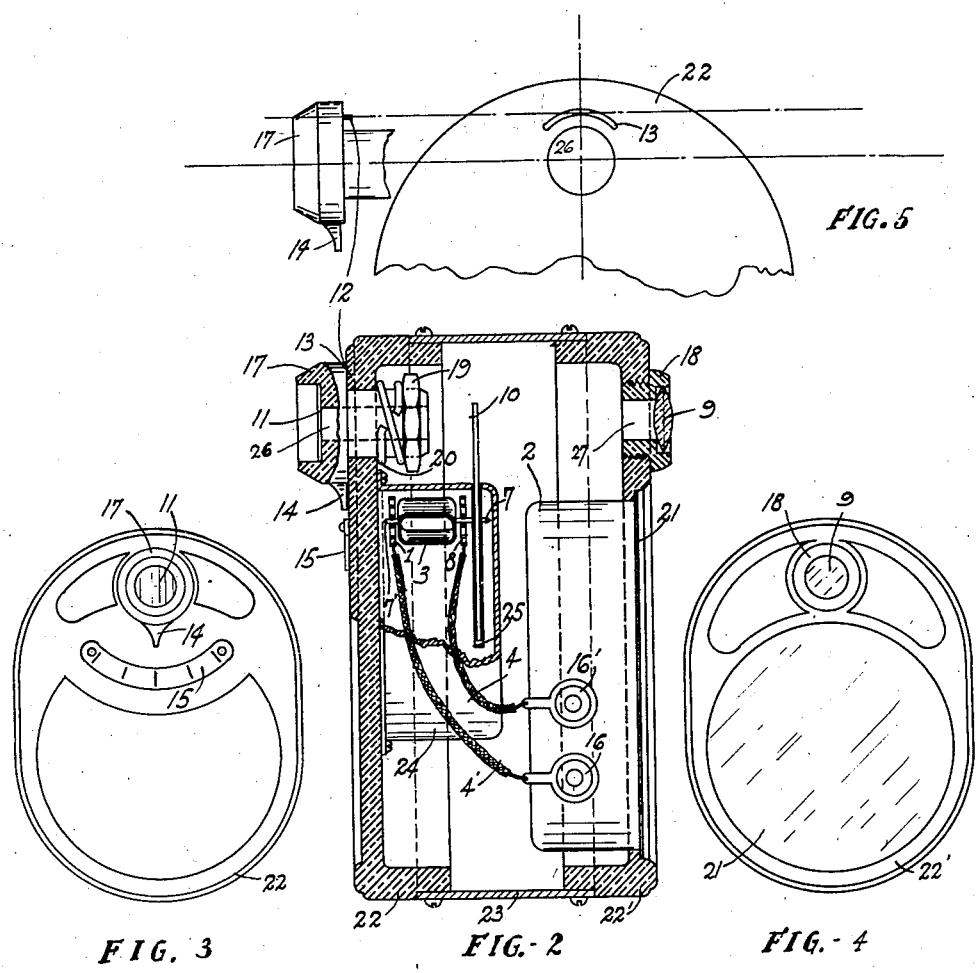

Patented Jan. 28, 1936

2,029,170

UNITED STATES PATENT OFFICE 2,029,170

PHOTOMETER

Lloyd Irving Hull, Milwaukee, Wis.

Application February 4, 1935, Serial No. 4,897

5 Claims. (Cl. 88—23)

My invention relates to photometers and especially to those types embodying means responsive to light for producing an electromotive force.

One object of my invention is to provide a photometer which requires no skill for manipulation on the part of the operator.

A further object is to provide a photometer of a nature which is especially useful in the photographic art in the respect that while it may be made as a separate portable unit, it adapts itself readily to construction as an integral part of a camera in such a manner that no readings will be required in determining the proper shutter settings for various light conditions.

My invention will be more fully understood from the following description taken in conjunction with the accompanying drawings.

Referring to the drawings:

Figure 2 is a partial sectional view of a suggested design for a portable photometer embodying the principles of my invention.

Figure 3 is a front view of the photometer shown in Figure 2.

Figure 4 is a rear view of the photometer shown in Figure 2.

Figure 5 is a detail of the upper portion of the front view of the photometer shown in Figure 2.

Figure 1:
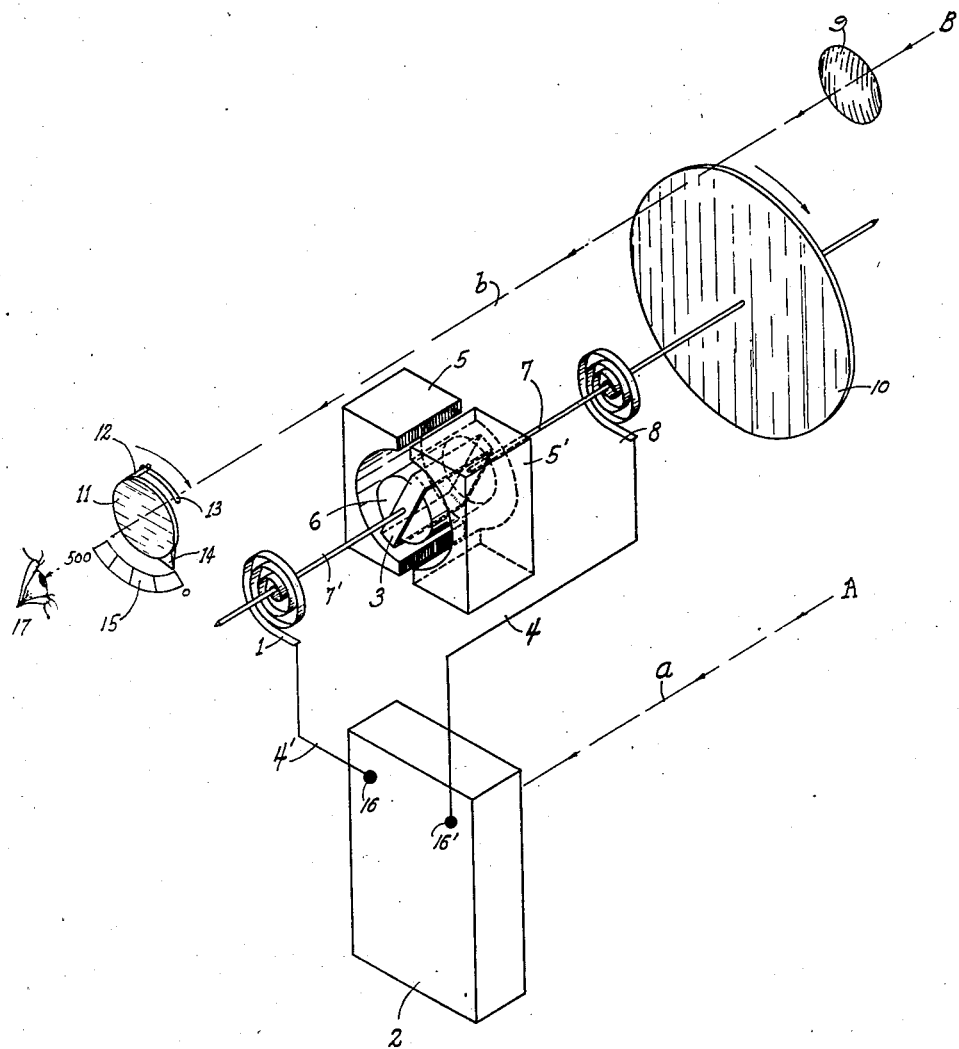
Figure 1 is a diagrammatic perspective view of apparatus embodying the principles of my invention.

In Figure 1, the light source to be measured, and light rays from said source are represented by A and $a$ respectively.

A photo-electric device 2, commonly termed a photo-electric cell, which has the property of producing an electromotive force at its terminals in proportion to the intensity of light falling on its sensitive elements, is arranged to receive light from a light source A to be measured.

Conducting leads 4 and 4' are connected from the terminals 16' and 16 respectively, of the photo-electric device, to spiral springs 1 and 8, of an electrical measuring instrument of the d'Arsonval type.

The shaft 7, a field coil 3, and shaft 7', are the rotary movable parts of said measuring instrument, and field magnet elements 5, 5' and 6, of usual types, constitute the stationary parts. The spiral springs 1 and 8 constitute other parts of the conventional measuring instrument and are semi-movable.

A tourmaline plate 10 is rigidly mounted on but rotatable with shaft 7 of the measuring instrument described in the preceding paragraph. The usual indicating needle and scale of the conventional instrument is not used.

Another tourmaline plate 11, which is adapted to be rotated within a limit of 90°, and which has a pointer fixed thereto for cooperation with a scale 15, is in optical alignment with the tourmaline plate 10 and lens 9 so that light from a light source B which is traveling along path $b$ in a direction shown by the arrow will, under certain conditions to be described later, reach the eye of an operator 17.

In order that my invention be more fully understood, a brief discussion on the properties of tourmaline crystal will be given here.

Tourmaline is a natural crystal possessing the property of polarizing light. A plate of tourmaline, about one to two millimeters in thickness, cut from a crystal parallel to a particular direction within the crystal called the optic axis, if placed in the path of a beam of light, at right angles to the direction of the beam, the light will be transmitted through the plate. Another plate of the crystal similarly cut and placed, that is as if they formed one and the same block of crystal, or stated otherwise, with their optic axes parallel, the light would still be transmitted. If one of the plates be turned around in its own plane, so as always to remain perpendicular to the beam of light, the light will be observed to fade gradually until the crystal has been rotated 90°, when the optic axes of the crystal will be at right angles to each other and complete extinction of the light occurs. If the turning be continued beyond the 90°, the light will begin to reappear; and when a second right angle has been completed, the optic axes of the crystals will again be parallel and a total transmission of the light will be observed as at the outset.

In my invention I have incorporated the phenomena related in the preceding paragraph in connection with the two tourmaline plates 10 and 11. With the pointer of tourmaline plate 11, which is adapted to be manually rotated in its own plane, set at zero, the two plates are arranged initially with their optic axes at right angles to each other or in the "dark" position as described above.

On account of the phenomena exhibited by the tourmalines, that is, the passing of light through the two tourmalines at maximum brilliancy when their optic axes are parallel to each other and the non-transmission characteristic when one plate has been turned through an angle of 90°, the rotation of the tourmaline plates are restricted to a rotation as follows:

Tourmaline plate 11 is limited to a rotation of 90° by stop-pin 12 which is attached to said tourmaline plate by suitable means, said pin cooperating with slot 13 to produce the desired result. Tourmaline plate 10 is limited to a rotation of 90° by the maximum deflection of the electrical measuring instrument to which it is attached by means of shaft of said instrument.

The operation of the apparatus of Figure 1 is as follows:

Light from the light source A to be measured travels along a light path $a$ in the direction indicated by the arrows and is received on a photo-electric cell 2. The electromotive force produced at terminals 16 and 16' by the action of the light on said cell will flow in an electrical circuit, the connections of which are as follows:

Terminal 16 through conducting lead 4' thence to spiral spring 1 which is electrically connected to one end of field coil 3, through field coil 3 and thence to spiral spring 8 by means of an electrical connection between said spiral spring and the remaining end of field coil, thence through conducting lead 4 to terminal 16' of the photo-electric cell.

The electromotive force, imposed on the field coil 3 in opposition to the magnetic force of the stationary field, causes the coil to alter its initial position in relation to the stationary field magnet elements in proportion to the electromotive force flowing through the coil which is proportional to the amount of light falling on the photo-electric cell. Shaft 7 being fixed to field coil rotates the tourmaline plate 10 in the direction indicated by the arrow. The rotation of said plate alters the perpendicular relation of the optic axes of the tourmaline plates, thereby allowing light from a light source B traveling along a light path $b$, to reach the eye of an operator 17, said light traversing lens 9, and tourmaline plates 10 and 11. Operator 17 rotates the tourmaline plate in the direction indicated by the arrow until he restores the original "dark" position, that is, he again places the crystals with their optic axes perpendicularly situated. A pointer 14 will indicate on a scale 15, which may be graduated in units suitable for the type of work for which it will be used, an intensity reading which will be proportional to the intensity of the light source being measured.

As previously stated Figures 2, 3, 4 and 5 show a suggested arrangement for construction of a portable photometer incorporating the principles of my invention. The parts shown are as follows: A moulded base plate 22 of an insulating material such as "bakelite", an electrical measuring instrument of the d'Arsonval type 24 and a calibrated scale 15 attached to said base plate by indicated means; a knob 17, with an opening 26, for manually rotating tourmaline plate 11 and said tourmaline mounted in a depression of said knob; a stop-pin 12 and a pointer 14 attached to said knob for cooperation with slot 13 in aforementioned base plate; a spring and a nut for securing knob in position indicated, through an opening in the base plate; another base plate 22' with a photo-electric device 2 attached to said base plate through an opening in said base plate; a lens 9 secured in a lens-holder 18, said holder being secured to base plate 22' by indicated threads; a metal collar 23 for assembling the base plates in one unit; two conducting leads 4 and 4' connected to terminals 16 and 16' of a photo-electric cell at one of their extremities and to spiral springs 1 and 8 of an electrical measuring device at their other extremity; a field coil 3 with its extremities electrically connected to spiral springs 1 and 8; a tourmaline plate 10 fixed to shaft 7 of the electrical measuring instrument; another shaft of said instrument 7'; a slot 25 in casing of the electrical measuring instrument for projecting of tourmaline plate through said casing; and a glass window 21 for admitting light to photo-electric cell. Field magnet elements 5, 5' and 6 are omitted from Figure 2 for clarity.

I have chosen the particular embodiments described above in connection with Figures 1, 2, 3, 4, and 5 as illustrative of the principles of my invention and it will be apparent that various other modifications may be made, such as, the use of a suitable coupling between tourmaline plate 11 and the shutter of a camera in case the photometer is built as an integral part of the same as suggested previously in these specifications. Another modification may be the use of an amplifier for "building up" the electromotive force generated by the photo-electric cell, before applying it to the field coil of the electrical measuring instrument. Still another modification may be the use of light filters for prohibiting undesirable rays from acting on the photo-electric cell. In fact many other modifications could be made without departing from the spirit and scope of my invention, which modifications I aim to cover in the following appended claims and while I have suggested a design for construction of a portable photometer in Figures 2, 3, 4, and 5 of the attached drawings, I do not make any claims for any specific construction of said meter.

What I claim as new and desire to secure by Letters Patent of the United States is:

1. A photometer comprising a photo-electric device constituting a source of current and arranged to receive light from a source to be measured and an electrical measuring instrument for indicating the electromotive force generated by said photo-electric device, having a rotatable shaft, an electrical connection between the measuring instrument and the photo-electric device, whereby to cause the shaft to rotate in response to current flowing through the device, and an optical system comprising two tourmaline plates, a lens, the lens and tourmaline plates being located in the same light path, one of said plates being mounted on the shaft for rotation therewith, the other of said plates being manually rotatable, a pointer attached by suitable means to the last mentioned plate and a scale for cooperation with said pointer, for determining the current flow through said indicating means.

2. In combination, an electrical measuring device having a rotatable shaft, light sensitive means supplying different current values to the electrical measuring device in accordance with different light intensiveness, a tourmaline plate mounted on the shaft in such a manner so as to be rotatable in its own plane, a second tourmaline plate located in the same light path as the first plate, manual means for rotating the last plate, and means indicating the amount of movement of the last plate.

3. In combination, a light source to be measured, a photo-electric device arranged to receive said light from said light source, an electrical measuring device electrically connected with the photo-electric device having a rotatable shaft movable in response to current flowing through the measuring device; an optical system for determining the electromotive force present in said measuring device when said photo-electric device is exposed to light, said optical system comprising a lens, and two tourmaline plates, the lens and plates being disposed in the same light path, one of said tourmaline plates being mounted for a maximum angular adjustment and the other being mounted on the shaft of the electrical measuring device and rotatable with said shaft within a limit determined by the maximum deflection of said electrical measuring device.

4. A photometer comprising a photo-electric device arranged to receive light from a light source, an electric measuring instrument having a rotatable shaft, an electrical connection between the photo-electric device and the measuring instrument whereby to cause rotation of said shaft in response to current flowing through the instrument, a disc of double refractive material mounted on the shaft and rotatable therewith, a manually rotatable disc of double refractive material located in the same light path as the first disc, and means for indicating the amount of movement of the said disc.

5. In a photometer, an electrical measuring instrument having a moving element, a light sensitive cell electrically connected to the measuring instrument, so that current from the cell will actuate the moving element, a double refractive plate mounted on said moving element, a second double refractive plate disposed in the same light path as the first double refractive plate, manual means for adjusting the second plate, and means indicating the amount of movement of the second plate.

LLOYD IRVING HULL.